United States Patent [19]

Ménioux

[11] 4,183,211
[45] Jan. 15, 1980

[54] PROPULSION SYSTEM FOR SUPERSONIC AIRCRAFT

[75] Inventor: Claude C. F. Ménioux, Boulogne-Billancourt, France

[73] Assignee: Societe Nationale d'Etude et de Construction de Moteurs d'Aviation, Paris, France

[21] Appl. No.: 827,704

[22] Filed: Aug. 25, 1977

[30] Foreign Application Priority Data

Aug. 30, 1976 [FR] France ................... 76 26938

[51] Int. Cl.² .................... F02K 3/04; F02K 11/00
[52] U.S. Cl. .................... 60/224; 60/39.26 B
[58] Field of Search ............. 60/39.15, 224, 226 R, 60/226 B, 263

[56] References Cited

U.S. PATENT DOCUMENTS

| | | | |
|---|---|---|---|
| 3,659,422 | 5/1972 | Hope | 60/224 |
| 3,677,012 | 7/1972 | Batscha | 60/263 |
| 3,841,091 | 10/1974 | Sargisson et al. | 60/226 B |
| 4,033,119 | 7/1977 | Nichols | 60/226 B |
| 4,054,030 | 10/1977 | Pedersen | 60/266 B |

Primary Examiner—Louis J. Casaregola
Attorney, Agent, or Firm—Bacon & Thomas

[57] ABSTRACT

An optimized propulsion system for aircraft whose flight range extends over a wide range of speeds. It comprises an outer turbojet engine and an inner turbojet engine housed within a single engine nacelle and arranged concentrically, the outer turbojet engine extending axially and around a narrow portion of the casing of the inner turbojet engine. The invention may be used in the field of variable-cycle engines, and particularly in the field of supersonic transport aircraft.

6 Claims, 2 Drawing Figures

PROPULSION SYSTEM FOR SUPERSONIC AIRCRAFT

BACKGROUND OF THE INVENTION

This invention pertains to a propulsion system for supersonic aircraft.

Since the flight envelope of a supersonic aircraft is very large, the propulsion engine cannot be optimized in every case and the properties required of it may even be contradictory. In particular, the principal obstacle to the development of the supersonic transport is the problem of take-off noise. It is essential that future supersonic transport aircraft satisfy not only existing regulations on take-off noise levels but also those being drafted at this time. This requirement, which entails a moderate ejection velocity, is consistent with the requirements of adequate low-speed efficiency, but can hardly be compatible with obtaining a small nacelle cross-section and good efficiency at supersonic speeds.

The principal characteristics required of the propulsion plant at supersonic cruising speeds are a low specific fuel consumption rate and a high specific thrust (thrust per unit of fuel flow rate).

The thrust furnished to the air frame by the propulsion system is the resultant of the engine thrust and the drag of the nacelle, primarily the wave drag, which represents a not negligible portion of the total drag of the aircraft.

Optimization should thus concern the entirety of the propulsion plant, rather than the engine alone.

The forebody drag is proportional to the cross-sectional area of the nacelle and depends on the difference between the sectional areas of the air intake and of the maximum cross sectional area of the nacelle.

As a first approximation, it may be said that the largest section of the nacelle is proportional to the engine intake cross-sectional area.

On take-off, the propulsion plant should have a low ejection velocity so as to reduce noise. In order to furnish satisfactory thrust, the propulsion plant thus requires a significant intake flow rate and, consequently, a large intake cross section. This requirement is hardly compatible with the problem posed by supersonic cruising.

Combined aircraft propulsion systems have already been proposed which provide wide ranges of speed and thrust by associating one or several turbojet engines with a by-pass turbojet engine.

Nevertheless, these known combination systems, which rely on a tandem or parallel arrangement, do not allow satisfactory aerodynamic configurations.

SUMMARY OF THE INVENTION

The present invention aims at the realization of an optimized system for both cruising operation and take-off performance.

The supersonic aircraft propulsion unit according to the present invention comprises one outer turbojet engine and one inner turbojet engine within a single engine nacelle and arranged concentrically so as to be able to function independently, the outer turbojet engine extending axially and around a narrow portion of the casing of the inner turbojet engine which is located between the high-pressure compressor and the combustion chamber.

In one mode of achievement, the outer turbojet engine is of the double-flow type, and its secondary channel is delimited by the system's engine nacelle.

In another mode of achievement, the outer turbojet engine is of the single-flow type and the inner turbojet engine is of the double-flow type, and the outer turbine engine is located within the space separating the primary and secondary flows of the double-flow turbojet engine.

The invention can be better understood by reading the following description and the annexed drawings, which are presented for illustrative purposes only and in which.

DESCRIPTION OF THE PREFERRED EMBODIMENTS

Figure 1:
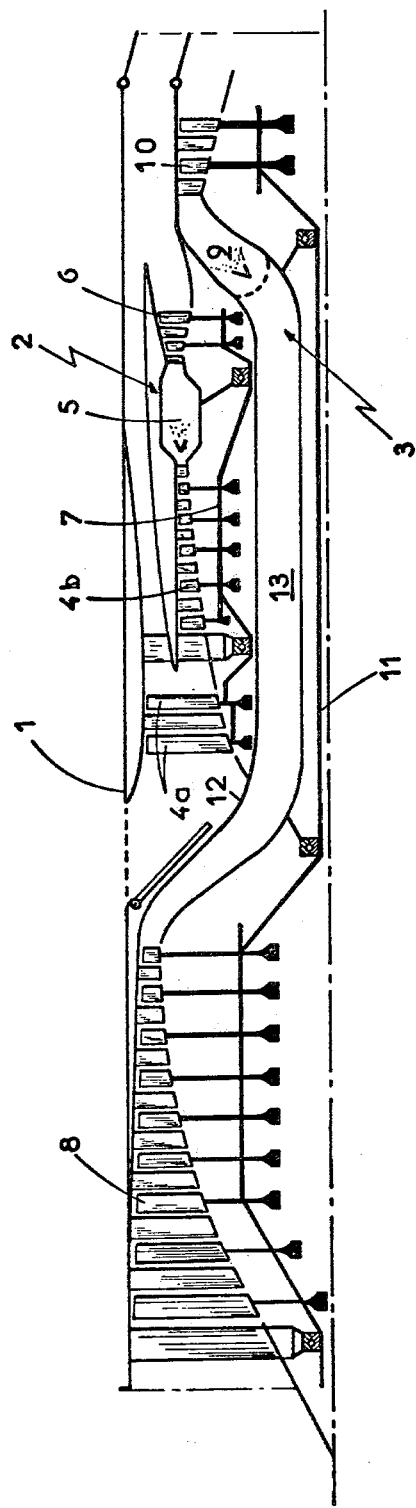
FIG. 1 is a schematic longitudinal half cross-sectional view of a propulsion system according to the present invention.

FIG. 1 depicts a propulsion system comprising an outer turbojet engine 2 and an inner turbojet engine 3 within a single engine nacelle 1.

The outer turbojet engine 2 is of the double-flow, single-spool type and comprises a low-pressure or fan 4a, a high-pressure compressor 4b, a combustion chamber 5 and a turbine 6. The LP compressor 4a and the HP compressor 4b are driven by the turbine 6 by means of a hollow shaft 7.

The inner turbojet engine 3 is of the single-flow, single-spool type and comprises, in the upstream-to-downstream direction, a high-pressure compressor 8, a combustion chamber 9 and a turbine 10 which drives the high-pressure compressor 8 by means of a shaft 11.

The casing 12 of the inner turbojet engine 3 defines a narrow part located between the compressor 8 and the combustion chamber 9. This narrow portion corresponds to an annular channel 13 which may have a small cross section since it is used to conduct highly compressed air.

Also to be noted, the angled configuration of the combustion chamber, with the object of providing a narrowed area in the inner engine casing.

The hollow shaft 7 of the outer turbojet engine 2 surrounds this narrow portion of the casing of the inner turbojet engine Air is fed in to the double-flow turbine engine through lateral air intake openings (not shown).

Thanks to this arrangement, a propulsion system is obtained wherein a double-flow engine and a single-flow engine are arranged within a single nacelle 1 having a small cross-section designed for a single-flow engine and which does not entail any increase of the total drag of the aircraft.

In operation during take-off, the double-flow engine 2 and the single-flow engine 3 are used simultaneously, the rating of the single-flow engine 3 being quite low in order to produce an acceptable noise level. The diameter of the bearings of the double-flow engine limits the rotation speed to a moderate level, thus the performance of the double-flow engine. Nevertheless, at take-off, this assemblage, consisting of a single-flow engine operating at low speed and a double-flow engine of modest performance, offers the advantage of having a lower specific fuel consumption rate than that of an afterburner-equipped single-flow engine with similar thrust characteristics. In addition, with this configuration, the noise level at take-off satisfies present regulations applicable to supersonic transport aircraft.

At supersonic cruising speed, the single-flow engine 3 operates alone and the lateral air intakes which supply air to the double-flow engine 2 are closed.

Figure 2:
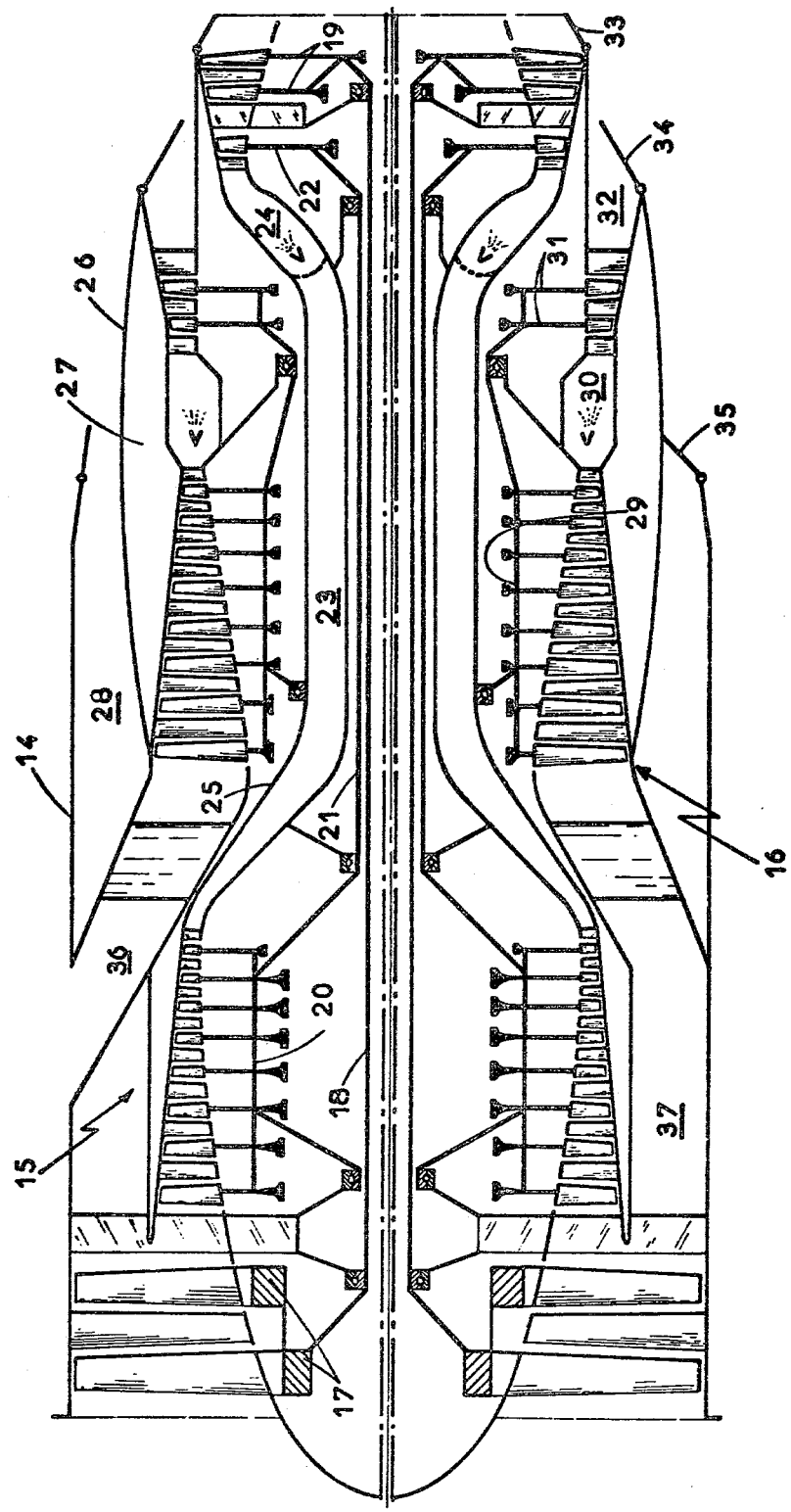
FIG. 2 is a schematic longitudinal cross-sectional view of another mode of achievement of a propulsion system according to the invention.

FIG. 2 shows a longitudinal section of a propulsion system according to a second mode of achievement. An inner twin-spool by-pass engine 15 and an outer single-spool turbojet 16 are concentrically arranged within a nacelle 14 which serves as a housing.

The inner turbojet engine 15 comprises a low-pressure compressor or fan 17 driven by a turbine 19 by means of a shaft 18 and a high-pressure compressor 20 driven by a turbine 22 by means of a hollow shaft 21 surrounding the shaft 18. The high-pressure compressor 20 feeds the combustion chamber 24 of the turbojet engine 15 through an annular channel 23 of small cross-sectional area.

As in the mode of achievement described above, the portion 25 of the inner casing of the inner turbojet engine 15, which extends between the high-pressure compressor 20 and the combustion chamber 24, is constricted and brought closer to the axis of the system. The portion 25 constitutes the inner wall of an annular enclosed chamber 27 which is bounded on the outside by an outer wall 26. The enclosed chamber 27 forms a separation between the primary flow which circulates in the annular space 23 and the secondary flow 28 which is supplied by the LP compressor 17 of the turbojet engine 15.

Located within the annular chamber 27 and extending axially and around the narrow portion 25 is the outer turbojet engine 16, of the single-spool, single-flow type, which comprises, in the upstream-to-downstream direction, a high-pressure compressor 29, a combustion chamber 30 and a turbine 31 exiting into an annular channel 32. The propulsion system comprises three concentric flows, namely the primary flow of turbojet engine 15, the annular flow of turbojet engine 16, and the annular secondary flow 28 of turbojet engine 15, which exhaust through adjustable nozzles 33, 34 and 35 provided with individual controls.

The air supply of the outer turbojet engine 16 consists of two channels 36 and 37 which are represented respectively on the upper half-section and lower half-section of the sectional view of FIG. 2. The channel 37 is fed by the LP compressor 17 and the channel 36 is composed of two feed conduits leading to lateral air intakes which can be obturated, for instance, by movable doors. Switching means, not shown, permit supplying air to turbojet engine 16 by either of channels 36 and 37.

In take-off configuration, the double-flow engine 15 and the single-flow engine 16 are used together; turbojet engine 16 is supplied by the side air intakes through channel 36. The system behaves in this case as an assembly of independent single-flow and double-flow engines. The outer turbojet engine operated at a rating low enough to yield an acceptable noise level.

In supersonic cruising operation, the turbojet engines 15 and 16 are also used simultaneously, the outer turbojet engine 16 being supplied with air by LP compressor 17 by means of channel 37 only. The side air intakes are closed in this case.

In subsonic cruising operation, the turbojet engine 15 is used alone, entailing an excellent specific consumption rate.

It is understood that the present invention is not limited to the modes of achievement described herein and covers as well a propulsion system comprising, for example, two concentrically mounted double-flow turbojet engines.

I claim:

1. Propulsion system for supersonic aircraft, characterized by the fact that it comprises, arranged within a single engine nacelle and mounted concentrically so as to be able to operated independently, an outer turbojet engine and an inner turbojet engine, the outer turbojet engine extending around a narrow axial portion of the inner turbojet engine which narrow portion defines an air conduit from a high-pressure compressor to a combustion chamber.

2. Propulsion system according to claim 1, wherein the outer turbojet engine is of the double-flow type and has a secondary channel bounded by the engine nacelle of the system.

3. Propulsion system according to claim 2, wherein the outer turbojet engine is supplied by lateral air intake ports.

4. Propulsion system according to claim 2, wherein the inner turbojet engine is of the single-flow type.

5. Propulsion system according to claim 1, wherein the outer turbojet engine is of the single-flow type and the inner turbojet engine is of the double-flow type, and the outer turbojet engine is housed within a space separating primary and secondary flows of the double-flow turbojet engine.

6. Propulsion system according to claim 5, wherein the air supply to the outer turbojet engine comprises two channels respectively connected to lateral air intake ports and to the secondary flow of the inner turbojet engine thereby providing for the supply of air to the outer turbojet engine by either of the said two channels.

* * * * *